Figure 1:
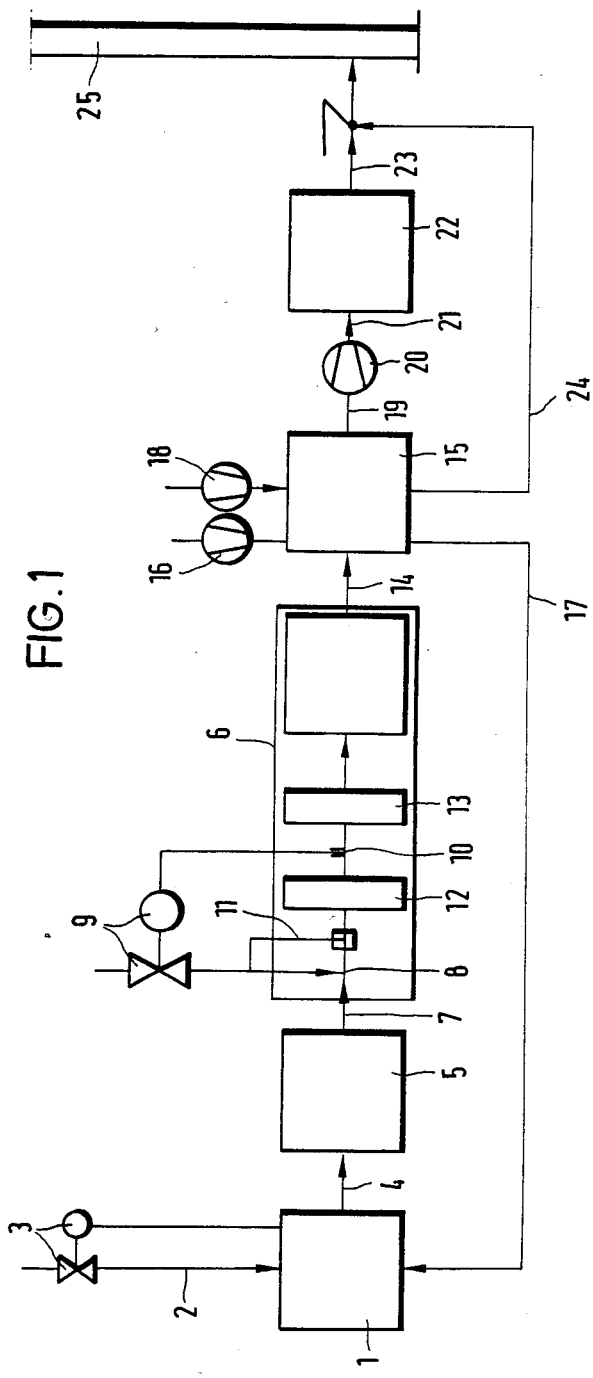

United States Patent [19]

Kraus, deceased

[11] Patent Number: 4,562,795
[45] Date of Patent: Jan. 7, 1986

[54] PROCESS AND EQUIPMENT FOR REDUCING THE EMISSION OF POLLUTANTS IN FLUE GASES FROM FURNACE INSTALLATIONS

[75] Inventor: Willibald Kraus, deceased, late of Zierenberg, Fed. Rep. of Germany, by Edith Kraus, Reinhild Kraus, Martin Kraus, heirs

[73] Assignee: Firma Ferdinand Lentjes Dampfkessel- und Maschinenbau, Düsseldorf-Oberkassel, Fed. Rep. of Germany

[21] Appl. No.: 632,445

[22] Filed: Jul. 19, 1984

[30] Foreign Application Priority Data

Jul. 20, 1983 [DE] Fed. Rep. of Germany ....... 3326100
Aug. 13, 1983 [DE] Fed. Rep. of Germany ....... 3329337
Sep. 1, 1983 [DE] Fed. Rep. of Germany ....... 3331545

[51] Int. Cl.$^4$ ............................................. F22B 33/00
[52] U.S. Cl. .................................... 122/1 R; 431/10; 110/347; 432/72
[58] Field of Search ................. 432/72; 110/343, 345, 110/347; 431/10; 122/1 R

[56] References Cited

U.S. PATENT DOCUMENTS

| 3,746,498 | 7/1973 | Stengel ................................. 431/10 |
| 3,865,084 | 2/1975 | DePoister ............................ 110/345 |
| 3,890,084 | 6/1975 | Voorheis et al. ..................... 431/10 |
| 3,914,091 | 10/1975 | Yamagishi et al. .................. 431/10 |
| 4,021,186 | 5/1977 | Tenner ................................. 431/10 |
| 4,098,567 | 7/1978 | Hubbert ............................... 432/72 |
| 4,246,853 | 1/1981 | Mehta ................................. 110/347 |
| 4,285,283 | 8/1981 | Lyon et al. ........................... 431/10 |
| 4,329,932 | 5/1982 | Takahashi et al. ................. 110/347 |
| 4,403,941 | 9/1983 | Okiura et al. ....................... 431/10 |
| 4,426,939 | 1/1984 | Winship .............................. 110/347 |

Primary Examiner—Henry C. Yuen
Attorney, Agent, or Firm—Toren, McGeady, Stanger, Goldberg & Kiel

[57] ABSTRACT

The process and the equipment for reducing emissions of pollutants in flue gases from furnace installations (1, 6) comprises a first furnace installation (1) operated with an air excess of, for example, 15%, and a second furnace installation (6) in which afterburning within the stoichiometric range is carried out, with consumption of the residual oxygen. The flue gases leaving the second furnace installation (6) no longer contain any free oxygen, but contain unburned hydrocarbons, carbon monoxide, nitrogen oxides, sulphur dioxide and sulphur trioxide as pollutants. The first-mentioned pollutants—unburned hydrocarbons, carbon monoxide and nitrogen oxides—are converted on a multi-functional catalyst into carbon dioxide, water vapor and nitrogen. The sulphur of the flue gas is oxidized by means of an oxidation catalyst (12) to sulphur trioxide which reacts with the water vapor contained in the flue gas to give sulphuric acid.

19 Claims, 6 Drawing Figures

PROCESS AND EQUIPMENT FOR REDUCING THE EMISSION OF POLLUTANTS IN FLUE GASES FROM FURNACE INSTALLATIONS

The invention relates to a process and equipment for reducing the emissions of pollutants in the flue gases from furnace installations in which a part of the fuel is burned with excess air in a first stage, and, in a second downstream stage, the remaining fuel is burned within the stoichiometric range with the residual oxygen in the flue gases from the first stage.

Known processes and equipment of this type for reducing the emission of nitrogen oxides function in such a way that gaseous ammonia ($NH_3$) is metered into the flue gas in the temperature range between 350° and 400° C. and the mixture is passed over catalysts. As a result, $N_2$ and $H_2O$ are formed from NO, $NO_2$, $O_2$ and $NH_3$. The costs of this known equipment for reducing the emissions of nitrogen oxide are about $\frac{1}{3}$ to one half of the already very high costs for a flue gas desulphurisation unit which is in any case required additionally, and the operating costs are also high because of the limited life of the catalysts.

Moreover, German Offenlegungsschrift No. 2,728,265 and British Patent specification No. 2,023,266 also disclose processes and equipment for reducing the emission of nitrogen oxides in flue gases from furnace installations by burning, in a first stage, a part of the fuel with excess air and, in a second downstream stage, burning a further part of the fuel stoichiometrically with consumption of the residual oxygen in the flue gas from the first stage. This is carried out in a first furnace installation operated with excess air and a second furnace installation which consumes the residual oxygen in the flue gas from the first furnace installation.

According to German Offenlegungsschrift No. 2,728,265, the first furnace installation consists of a combustion chamber and the second furnace installation consists of a further combustion chamber. Heat exchangers are located in the furnace installations. The fuel is passed via a burner into the first combustion chamber and via a burner into the second combustion chamber. The burners, the combustion chambers and the heat exchangers are each designed to provide about half of the required thermal output. The combustion takes place in the first combustion chamber with an air excess of about 2 to 2.5 and, in the second combustion chamber, preferably with an air excess of 1.125 to 1.3, which corresponds to an exit gas recycle ratio of 80%. The process and the equipment according to German Offenlegungsschrift No. 2,728,265 are designed for preventing the formation of nitrogen oxides during the combustion from the start, and this is to be achieved by means of the indicated excess air figures in the first and second stages. Thus, the high excess air in the first stage is intended to ensure relatively low combustion temperatures, even if the combustion air fed in is very highly preheated. The same applies analogously to the second combustion stage.

Whilst, according to German Offenlegungsschrift No. 2,728,265, a relatively low combustion temperature and hence only small quantities of nitrogen oxides are to be achieved solely by the design of the equipment and the indicated air excess figures, a multi-stage catalytic combustion is employed for this purpose according to British Patent Specification No. 2,023,266. In the equipment according to British Patent Specification No. 2,023,266, pure stoichiometric combustion is required for the last stage, because of the catalytic combustion, whilst only the indicated values can be achieved in practice in the equipment according to German Offenlegungsschrift No. 2,728,265.

Both types of equipment share the disadvantage that, for the same output, they have to be bigger than equipment running at higher combustion temperatures. This is because the gas throughput must be greater, and, above all, since the combustion temperature is lower, all the equipment parts used for heat transfer must have very much larger areas due to the smaller temperature difference. These types of equipment also require a downstream flue gas desulphurisation unit.

Starting from this state of the art, the main object of the invention is to eliminate the above disadvantages and, in particular, to provide a process and equipment for reducing the emissions of nitrogen oxides in flue gases from furnace installations, so that catalytic removal of the nitrogen oxides can be achieved without addition of extraneous substances and with allowance for the special factors of fuel combustion in furnace installations, in particular steam generation units. At the same time, the combustion should, in the usual way, be as complete as possible in both stages and should in order to ensure high efficiencies and low investment costs of the installation.

The particular factors in combustion in furnace installations are that in particular those fired with pulverised coal require an air excess of 15% to 30%, corresponding to an excess air factor of Lambda=1.15 to 1.30. However, the known waste gas catalysts can operate only in the vicinity of the stoichiometric composition of the waste gases, that is to say in a range of the excess air factor $\lambda$ from 0.965 to 1.01.

Allowing for these special factors, the basic object of the invention is achieved when, in the first stage, the predominant part of the fuel is consumed by conventional combustion matched to the fuel used with respect to excess air, and the nitrogen oxides contained in the flue gases are catalytically reduced to nitrogen after the second stage. Due to the two-stage combustion, the oxygen in the flue gases leaving the first stage can be consumed completely, so that the known waste gas catalysts for reducing the nitrogen oxides can be used.

The thermal outputs produced in the stages are advantageously divided in such a way that about 85% of the required thermal output is produced in the first stage at an air excess of about 15%, and the remainder of the thermal output is produced in the second stage. This means that the first stage in all its parts has to be sized only for an output which is equal to 85% of the total required output, so that the investment costs of the first stage are reduced. Moreover, a marked improvement in efficiency can be obtained since, due to the overall stoichiometric operation, the waste gas stream is reduced, at the same total heat output, by the amount of the air excess necessary in conventional furnace installations, and the waste gas loss is correspondingly reduced. Furthermore, the drive power required for the fresh-air and suction draught fans is lower, since less air and flue gas have to be delivered.

Control of the furnace installations operated by the process according to the invention is preferably such that the fuel feed in the first stage is controlled, with substantially constant excess air, as a function of the required output, and the fuel feed to the second stage is controlled as a function of the oxygen content of the flue gases. This means that, when the required output is reduced, the fuel feed and air feed to the first stage are controlled down and that, subsequently, the fuel feed to the second stage is then adjusted in such a way that the oxygen in the flue gases is completely consumed.

The oxygen content of the flue gases is preferably measured downstream of the second stage with the aid of a λ probe.

When the flue gases leaving the first stage have a relatively low temperature of about 300° to 350° C., the afterburning in the second stage is advantageously carried out catalytically.

In the first stage, a cheap, ash-containing fuel, for example pulverised coal, can be burned, if dust is precipitated downstream from the flue gases, in order to prevent adverse effects on the oxidation catalyst and reduction catalyst in the second stage. In the second stage, virtually ash-free fuel, preferably fuel gas, is then burned. The use of fuel gas in the second stage does not require any additional investments as compared with a conventional furnace installation operated with pulverised coal, since in the latter a pilot firing, operated as a rule with natural gas or with fuel oil, is always present. Of course, other fuel gases, which can be more advantageous in some cases, such as, for example, coke gas or gasification gas, can also be used, and it can prove advantageous to provide a separate coal gasifier for this purpose.

The installation operating by the process according to the invention has a first furnace installation operated with excess air, a second furnace installation which consumes the residual oxygen in the flue gases from the first furnace installation, and a reduction catalyst for the nitrogen oxides. The furnace installations can represent parts of a steam power station or they can be used for process steam generators or district heating installations.

When the boiler section forming the first furnace installation is provided with pulverised coal firing, a hot horizontal dust precipitator for the flue gases must be provided in the flue gas outlet.

The boiler section forming the second furnace installation has, in the flue gas stream coming from the first boiler section, a fuel gas feed, an oxidation catalyst and a reduction catalyst. In addition, a control device, depending on the steam pressure, for the pulverised coal firing and a control device, depending on a λ probe arranged between the oxidation catalyst and the reduction catalyst, for the fuel gas feed are provided.

The use of a multi-functional platinum-rhodium catalyst, having an oxidising action on unburnt hydrocarbons and carbon monoxide and a reducing action on nitrogen oxides, is particularly advantageous. It is entirely possible to arrange a large number of three-way catalysts parallel to one another, whereby it becomes possible, in an inexpensive manner, to reduce the quantity of nitrogen oxides in power station waste gases, since these catalysts as mass products are obtainable at favourable prices. In multi-functional three-way catalysts, all three pollutant components—hydrocarbons, carbon monoxide and nitrogen oxides—are simultaneously converted into $CO_2$, $H_2O$ and $N_2$, that is to say the hydrocarbons and the carbon monoxide are oxidised, whilst the nitrogen oxides are eliminated reductively.

The initiation behaviour of the multi-functional three-way catalysts is very good and their excellent ageing resistance allows long operating periods. The same applies to the oxidation catalyst which has the form of a platinum-palladium catalyst. If necessary, an ignition aid in the form of a pilot burner, for initiating ignition, can be provided upstream of this oxidation catalyst.

Downstream of the dust precipitator, the flue gas still has a dust content of at most 50 mg/m$^3$ (S.T.P.). Over a prolonged period, this residual dust can deposit on the catalysts and on the adjacent wall surfaces. To enable the deposits to be removed, cleaning blowers arranged upstream, between and/or downstream of the catalysts are provided.

A steam boiler installation provided with the two-stage combustion according to the invention consists of a boiler section fired with pulverised coal and having feedwater preheater, vaporiser and superheater surface groups which are designed for approximately 85% of the required boiler output, of a by-pass control flap, arranged upstream of the feedwater preheater surfaces, for the flue gases and of a flue gas control flap arranged in the flue gas duct upstream of the entry of the flue gases flowing through the by-pass control flap, followed by a hot horizontal electrostatic filter as a dust precipitator, of a further boiler section heated with fuel gas and having feedwater preheater, vaporiser and superheater surface groups designed for approximately 15% of the required boiler output, of a fuel gas feed arranged at the inlet of the boiler section, of a downstream pilot burner, an oxidation catalyst and a multi-functional catalyst, and of an air preheater, through which the flue gases flow and which is designed for the required combustion air and additionally for heated air which is admixed to the flue gases after they have left a flue gas desulphurisation unit. The size of this air preheater corresponds to that of a conventional steam boiler installation designed for 100% of the required output, so that the waste gas stream, which is smaller in the steam boiler installation according to the invention, is cooled to a lower temperature. Thus, more heat is recovered from the wate gases, and this leads to an improvement in the efficiency of the overall installation. Since only about 80% of the fresh air passed through the air preheater is required for the combustion of the pulverised coal and the fuel gas, about 20% of the heated air can be branched off and admixed to the cold flue gases leaving the flue gas desulphurisation unit. In this way, the flue gas can be brought to the required minimum temperature of, for example, about 90°, before it passes into the stack, without additional energy having to be supplied for reheating the flue gases.

In order to avoid unnecessary throttling losses caused by the fact that the pressure head of the combustion air is higher than the pressure head of the heated air, which is to be admixed to the flue gases, after these have left the flue gas desulphurisation unit, if this heated air is branched off from the total stream of the air passed through the air preheater, separate passes are preferably provided in the air preheater for the combustion air and for the air to be admixed to the flue gases, and associated separate fans with correspondingly adapted power and pressure head are also provided.

In the type of flue gas desulphurisation, described above and proven in itself but relatively expensive downstream of the reduction of nitrogen oxides, the heat of reaction of the sulphur dioxide oxidation remains unutilised for the thermal output of the installation. In particular, the above process and the equipment for reducing the emission of nitrogen oxides can be improved in such a way that the heat gain of the sulphur dioxide oxidation is utilised for improving the efficiency of the installation, and at the same time a very largely sulphur-free waste gas is obtained.

This is achieved when the sulphur dioxide of the flue gases is oxidised catalytically to sulphur trioxide, downstream of the first stage of the furnace installation.

Such a catalytic sulphur dioxide oxidation can be integrated in the furnace installation at very small expense and makes it possible to utilise the heat of the oxidation reaction, without additional expenditure on equipment, together with the heat content of the flue gas in the second stage of the furnace installation.

The oxygen required for the catalytic oxidation of the sulphur dioxide can come from the excess air or from the flue gas, or it can be fed into the flue gas upstream of the $SO_2$ oxidation stage. In detail, this depends on whether the sulphur dioxide is oxidised upstream of the afterburning in the second stage or downstream of the nitrogen oxide reduction stage.

Since the oxidation of the sulphur dioxide takes place at about 400° to 500° C., it may be necessary to adjust the flue gases to this reaction temperature, in particular if the $SO_2$ oxidation takes place upstream of the fuel feed to the second stage. If the sulphur dioxide oxidation stage is arranged downstream of the nitrogen oxides reduction stage operating at about 650° to 700° C., the requisite reaction temperature is automatically obtained.

For carrying out the process according to the invention, an installation is suitable which consists of a first furnace installation operated with excess air, of a second furnace installation consuming the residual oxygen in the flue gases from the first furnace installation and of a reduction catalyst for the nitrogen oxides and in which an oxidation catalyst for the sulphur dioxide is arranged downstream of the first furnace installation. The presence of the oxygen required for the oxidation of sulphur dioxide can be ensured by at least one air nozzle or oxygen nozzle ending between the reation catalyst and the oxidation catalyst. This is the case in particular if the combustion of the residual oxygen in the second furnace installation takes places stoichiometrically. In the case of more than stoichiometric combustion, however, only a little oxygen or none at all needs to be fed into the flue gas for the oxidation of sulphur dioxide.

In order to adjust the reaction temperature necessary for the catalytic oxidation of sulphur dioxide, heating surfaces are located between the reduction catalyst for the nitrogen oxides and the oxidation catalyst for the sulphur dioxide. These heating surfaces are unnecessary if the oxidation catalyst for the sulphur dioxide is arranged upstream of the reduction catalyst for the nitrogen oxides and upstream of the fuel feed to the second furnace installation. In this case, the flue gas enters the catalyst bed for the oxidation of sulphur dioxide at a substantially lower temperature and with its entire residual oxygen content, so that neither cooling of the flue gas nor an oxygen feed is required for the oxidation of the sulphur dioxide. The fuel feed can then be reduced in accordance with the oxygen consumption during the sulphur dioxide oxidation.

In order to prevent premature condensation of the sulphuric acid resulting from the sulphur dioxide oxidation and hence corrosion of equipment, the water inlet temperature of a feedwater preheater at the cold end of the second furnace installation should be above the dew point of the flue gases. This can be ensured, for example, by feeding the hot water from a feedwater preheater at the cold end of the first furnace installation into the feed line of the feedwater preheater of the second furnace installation. A part stream of the hot water can then be fed into the said feedline via a preheater arranged in a steam drum of the first furnace installation.

The flue gases leaving the feedwater preheater of the second furnace installation are preferably cooled in a recuperative air preheater down to a temperature below the dew point, in order to enable sulphuric acid of high concentration to be separated from the flue gases in this way.

This is preferably accomplished by two-stage cooling in the air preheater, with a hot stage at a temperature above the dew point and a cold stage at a temperature below the dew point, the condensed sulphuric acid then being withdrawn from the latter.

Figure 2:
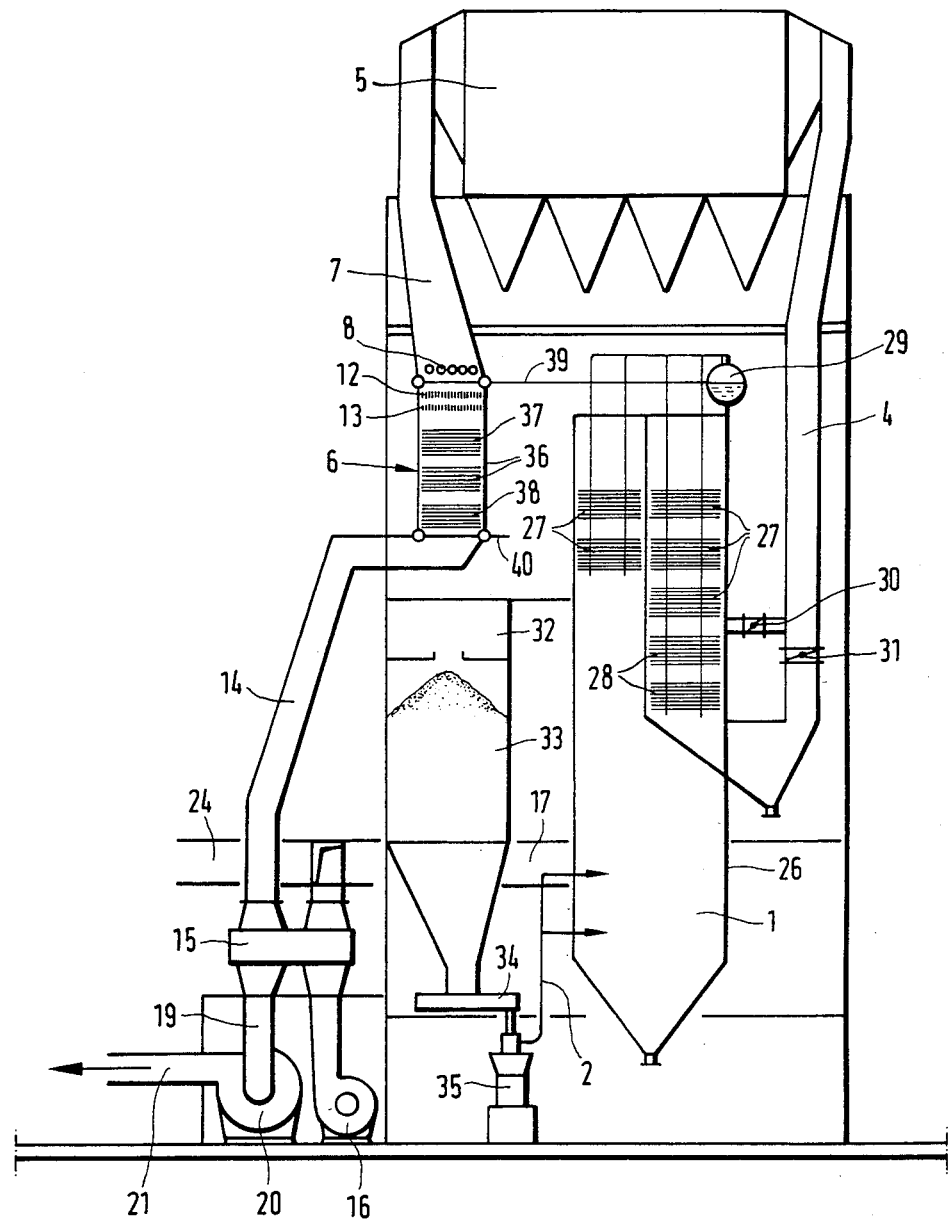
Figure 3:
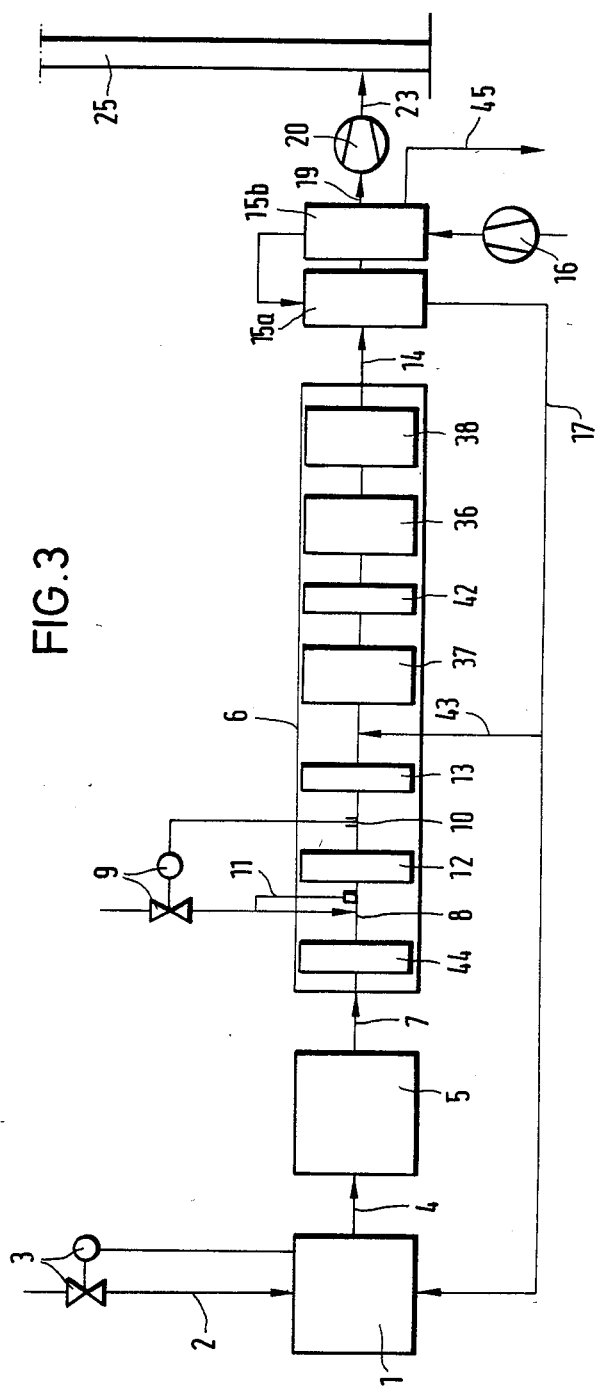
Figure 4:
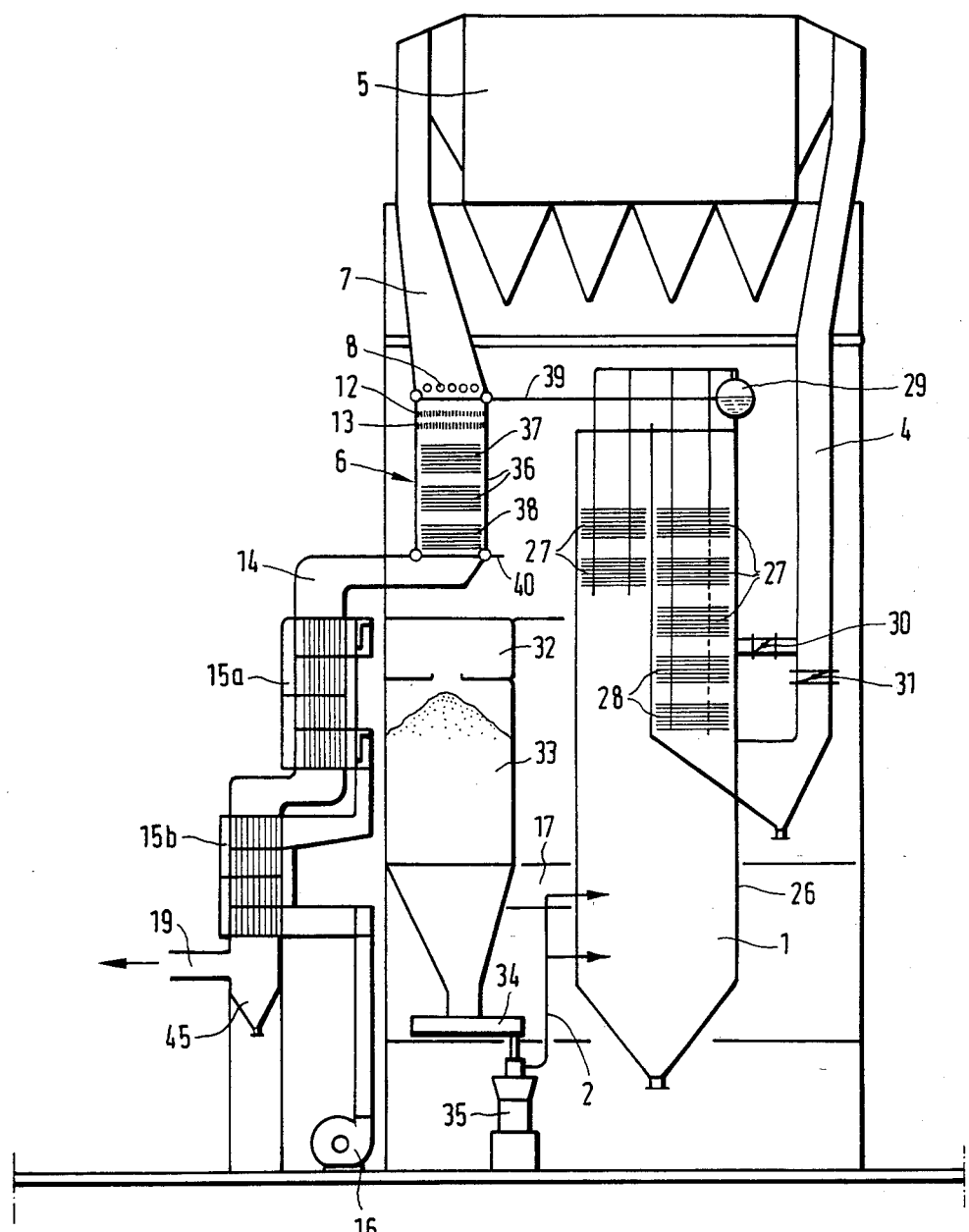
Figure 5:
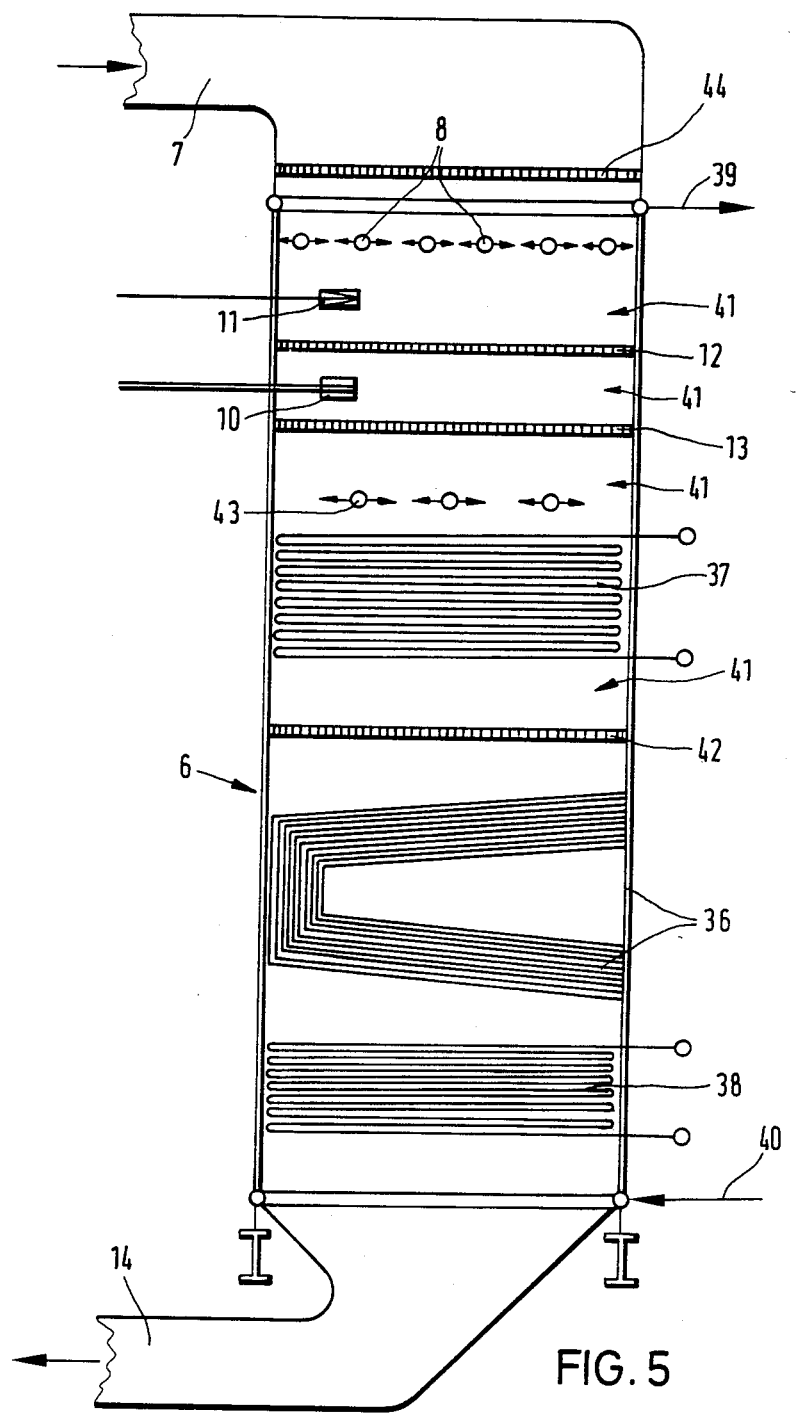
Figure 6:
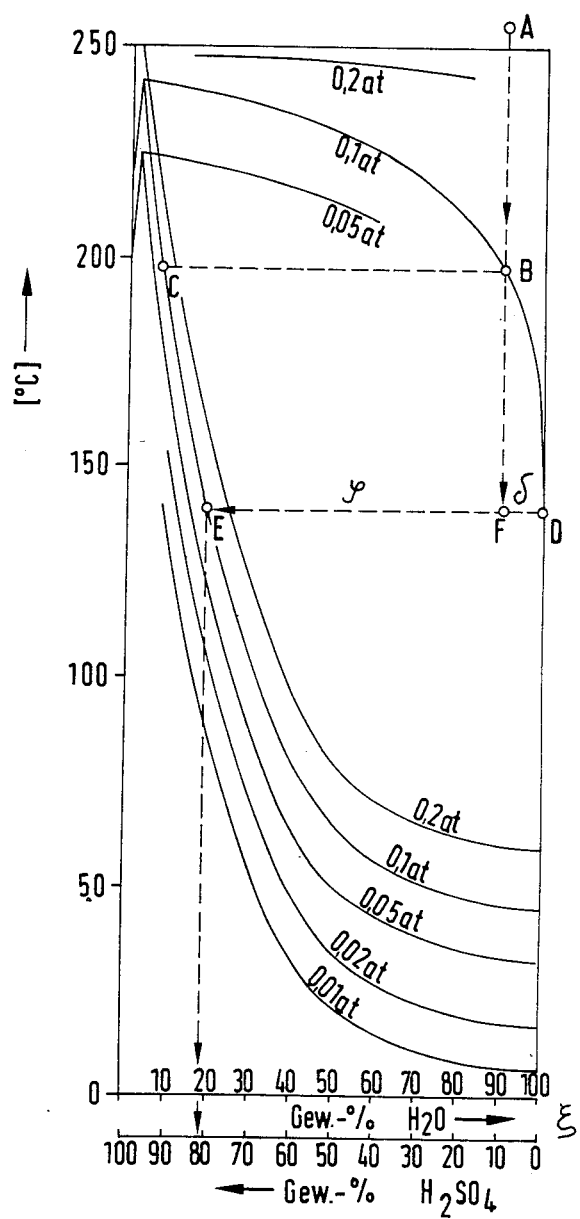

The invention is explained below in more detail by reference to several illustrative embodiments represented in the drawing in which:

FIG. 1 shows a block diagram of an installation operating in accordance with the process of the invention, FIG. 2 shows an illustration of a power station steam boiler installation with two-stage combustion according to the invention, FIG. 3 shows a block diagram of an installation operating in accordance with the process of the invention, with an additional sulphur dioxide oxidation stage, FIG. 4 shows an illustration of a power station steam boiler installation corresponding to FIG. 3, FIG. 5 shows a sectional diagram of the second boiler section used in the power station installation according to FIG. 2 and FIG. 4, and FIG. 6 shows a diagram of the pressure-dependent and concentration-dependent dew point lines and boiling lines for sulphuric acid/water vapour mixtures.

The installation shown diagrammatically in FIG. 1 is related to the steam generation installation for a steam power station, shown in FIG. 2. In principle, however, an installation according to the diagram in FIG. 1 is also suitable as a process steam generation unit or as a unit for producing district heat.

Fuel is fed, for example as pulverised coal via a pulverised coal feed 2, to a first furnace installation 1. As is conventional with furnace installations of this type, the furnace installation 1 is operated with an excess air factor $\lambda$ equal to 1.15. About 85% of the required thermal output is produced in the furnace installation 1. In a steam power station, the fuel feed is usually controlled as a function of the steam consumption. For this purpose, a controller 3 is provided which, via the pulverised coal feed 2, keeps the steam pressure in the installation constant. The pulverised coal fed is burned with preheated combustion air fed in via a combustion air duct 17, and the flue gases pass through a flue gas duct 4 into a dust precipitator 5. This dust precipitator is necessary only if ash-containing fuels, such as pulverised coal, are used. If largely ash-free fuels are fired in the furnace installation, the dust precipitator 5 can be omitted. From the dust precipitator 5, the flue gases still containing about 3% of oxygen pass via a flue gas duct 7 into a second furnace installation 6. Additional, largely ash-free fuel is fed to the second furnace installation in such a quantity that the oxygen still present in the flue gas is completely consumed. For this purpose, a fuel gas feed 8 is provided at the inlet of the furnace installation 6. Instead of fuel gas, however, a liquid fuel, for example fuel oil, can be used as well. A $\lambda$ probe 10 is connected to a controller 9 which always adjusts the fuel gas rate fed in such a way that the total oxygen still contained in the flue gas from the first furnace installation 1 is consumed. If necessary, a pilot burner 11, likewise operated with fuel gas, can be provided downstream of the fuel gas feed 8.

The stoichiometric mixture consisting of flue gas with excess oxygen and of fuel gas and produced by the controlled fuel gas feed is passed over an oxidation catalyst 12 and here completely burns to $CO_2$ and $H_2O$. The oxidation catalyst is preferably prepared on the basis of platinum-palladium. The $\lambda$ probe 10 is arranged downstream of the oxidation catalyst 12 in a zone where the combustion of the fuel gas is complete. The pollutant components contained in the flue gas, namely unburned hydrocarbons, carbon monoxide and nitrogen oxides are catalytically converted on a reduction catalyst into carbon dioxide, water vapour and nitrogen. For this purpose, the reduction catalyst 13 represents a multi-functional platinum-rhodium three-way catalyst.

Corresponding to the quantity of oxygen contained in the flue gases from the first furnace installation 1, about 15% of the total thermal output can be produced in the second furnace installation 6. The oxygen-free flue gas from the furnace installation 6 passes via a flue gas duct 14 into an air preheater 15. The fresh air required for the furnace installations 1 and 6 is delivered through this air preheater by means of a first fan 16 and fed via the combustion air duct 17 to the first furnace installation 1. A further fresh air fan 18 likewise delivers air through the air preheater 15, and this air is passed out through a fresh air duct 24. The passes of the air delivered by means of the fresh air fans 16 and 18 through the air preheater 15 are separated from one another in such a way that there is no connection between these ducts, so that the fresh air fans 16 and 18 operate independently of one another at different delivery rates and pressure heads.

From the air preheater 15, a flue gas duct 19 leads via a suction draught fan 20 and a further flue gas duct 21 into a flue gas desulphurisation unit 22. In this flue gas desulphurisation unit 22, the flue gases are cooled to such an extent that reheating is necessary before it is introduced into a stack 25. For this purpose, the mixed air duct 24 leads into a flue gas duct 23 located between the flue gas desulphurisation unit 22 and the stack 25. The flue gases are reheated to an adequate temperature by the mixed air here fed in.

The application of the process according to the invention to a steam power station installation is shown in detail in FIG. 2. The first furnace installation is formed by a boiler section 1 with a pulverised coal feed 2 to the combustion chamber of this boiler section 1. The boiler section 1 is provided in the conventional manner with vaporiser heating surfaces 26, superheater surfaces 27 and feedwater preheater surfaces 28. Above the boiler section 1, there is a steam drum 29. The flue gases are discharged from the boiler section 1 via the flue gas duct 4. A by-pass control flap 30 for the flue gases makes it possible to pass a part of the flue gases into the flue gas duct 4 in the zone between the superheater surfaces 27 and the feedwater preheater surfaces 28. For this purpose, a flue gas control flap 31 is additionally provided in the flue gas duct 4 upstream of the junction of the flue gases flowing through the by-pass control flap 30.

The coal required as fuel is fed via a coaling unit 32 to a coal bunker 33. The coal passes from this coal bunker 33 in the quantity required at the time via metering hoppers 34 into mills 35, from where the coal flows as pulverised coal into the pulverised coal feed 2. In the flue gas duct 4, the flue gases are cooled to about 330° C., and they flow through the dust precipitator 5 constructed as an electrostatic filter. The fly dust is precipitated in the electrostatic filter 5 down to a dust content of the pure gas of at most 50 mg/m$^3$ (S.T.P.). From the electrostatic filter 5, the flue gases pass through a flue gas duct 7 into a second boiler section 6 which contains the second furnace installation for the two-stage combustion. The fuel gas is fed to the flue gases via the fuel gas feed 8 in the form of distributor tubes arranged over the entire inlet cross-section of the boiler section 6 in such a way that thorough mixing of the flue gases and the fuel gas takes place. The fuel gas rate fed is controlled in such a way that a stoichiometric mixture with the flue gas is obtained. This mixture burns catalytically when it flows through the oxidation catalyst 12, the gas temperature rising to 680° C., if the fuel gas used is natural gas and the residual oxygen content in the flue gas coming from the first boiler section 1 is 3%.

At these temperatures, the individual gas components are completely converted on the oxidation catalyst consisting of platinum and palladium. The conversion temperatures for the individual gas components are as follows: $H_2$ at under 100° C., CO at 20° to 200° C., $C_2H_2$ at 140° to 240° C., $C_2H_4$ at 175° to 300° C. and so on. Even $CH_4$, which is the most difficult to convert, is completely converted in the range from 300° to 450°.

At the outlet from the oxidation catalyst 12, the flue gas meets the conditions which must be fulfilled for treatment in the downstream multi-functional platinum-rhodium three-way catalyst 13. All three pollutant components—unburned hydrocarbons, carbon monoxide and nitrogen oxides—are here simultaneously converted into $CO_2$, $H_2O$ and $N_2$. The multi-functional catalyst 13 thus effects an oxidation of the unburned hydrocarbons and of the carbon monoxide, and a reduction of the nitrogen oxides to $N_2$.

If necessary, an ignition aid in the form of a pilot burner 11 can be provided, for initiating ignition, upstream of the oxidation catalyst 12 which itself gives excellent initiation and has good continuous activity properties. The need for such a pilot burner 11 depends on the flue gas temperature at the outlet of the boiler section 1. This flue gas temperature can be regulated over the entire load range to the lowest permissible temperature by measures taken within the boiler, for example via a by-pass control by means of the by-pass control flap 30 and the flue gas control flap 31. Moreover, the temperature rise of the flue gases in the oxidation catalyst 12 is affected by the residual oxygen content in the flue gas, that is to say by the excess air in operation of the first boiler section 1.

When leaving the multi-functional catalyst 13, the flue gas stream is completely burned and then contains only $SO_2$ and $SO_3$ as pollutants. This flue gas at a temperature of about 680° C. is then cooled in the boiler section 6, with vaporiser heating surfaces 36, superheater surfaces 37 and feedwater preheater surfaces 38, to the flue gas temperature desired within the process, before it enters the air preheater 15. The boiler section 6 is connected via a steam line 39 to the steam drum 29 and, via a boiling water line 40, to a downpipe (not shown) leading to the steam drum 29.

Via the flue gas duct 14, the flue gases pass through the air preheater 15 and flow from the latter at a temperature of 90° C. into a flue gas duct 19 and are delivered by means of a suction draught fan 20 and a flue gas duct 21 into the flue gas desulphurisation unit 22. The fresh air delivered by the fresh air fan 16 enters the air preheater 15 at about 45° C. and is heated to about 320° C. in the air preheater 15. The major part of the fresh air passed through the air preheater 15 reaches the combustion chamber of the first boiler train 1 via the combustion air duct 17, whilst a small part of the heated fresh air is delivered through the mixed air duct 24 to the flue gas duct 23 downstream of the flue gas desulphurisation unit 22, where it reheats the flue gas leaving the flue gas desulphurisation unit 22° to 90° C. The cooling of the flue gases in the air preheater 15 to about 90° C. is feasible without the feared encrustations occurring, because the flue gases are virtually free of dust.

In the illustrative embodiment shown in FIGS. 3 to 5, with an oxidation catalyst for the sulphur dioxide, identical parts are marked with the same reference numerals, and only the additional pieces of equipment are described in detail.

The oxidation catalyst 44 or 42 for the sulphur dioxide can be located either upstream of the fuel gas feed 8 or downstream of the reduction catalyst 13 for the nitrogen oxides, and it is preferably a platinum-palladium catalyst. The sulphur trioxide formed reacts almost quantitatively with the water vapour contained in the flue gases, to give sulphuric acid.

When leaving the multi-functional catalyst 13, the flue gas is completely burned and then contains only $SO_2$ and $SO_3$ as pollutants. This flue gas at a temperature of about 680° C. then passes over the superheater surfaces 36, vaporiser heating surfaces 37 and feedwater preheater surfaces 38, where it is cooled to the flue gas temperature desired within the process, before it enters the air preheater 15. If the oxidation catalyst 42 is located downstream of the reduction catalyst 13, three nozzles 43 are provided upstream of the oxidation catalyst 42 in the direction of flow, the oxygen which may be required for the oxidation of sulphur dioxide being fed into the flue gas through the nozzles, unless the oxidation by means of the catalyst 12 is controlled in such a way that the flue gas still contains sufficient oxygen. Furthermore, superheater surfaces 37, by means of which the flue gas temperature can be brought to the temperature of 400° to 500° C. required for oxidation of sulphur dioxide, are provided upstream of the oxidation catalyst 42 in the direction of flow.

Alternatively, however, the oxidation catalyst 44 for the sulphur dioxide can also be located upstream of the oxidation catalyst 12 in the direction of flow. In this case no oxygen feed is required, in view of the oxygen content of the flue gas. The fuel gas feed is then controlled in the same way via the λ probe 10. However, a lower rate is required, because the $O_2$ content has been reduced by the oxidation of $SO_2$.

The conversion of the sulphur trioxide from the catalytic oxidation of sulphur dioxide proceeds very rapidly and, in view of the high water vapour concentration, completely. At the same time, the dew point rises with increasing sulphuric acid concentration, as can be seen from the dew point lines in the diagram of FIG. 6. In order to protect the pressure-bearing heating surfaces of the feedwater preheater 38 from corrosion by sulphuric acid, the water inlet temperature of this heater is then always kept above the dew point, so that it is impossible for the sulphuric acid to condense out. The water inlet temperature can here be adjusted by admixing hot water from the feedwater preheater 28 of the first furnace installation 1. If the temperature of the hot water is not high enough, a part stream of the hot water from the feedwater preheater 28 can be fed via a special preheater, not shown in the drawing, in the steam drum 29 into the preheater 38 or its feedline. The steam temperatures in the steam drum 29 are sufficient for heating the part quantity concerned to an adequate extent.

The flue gases leaving the feedwater preheater 38 are initially cooled in the first stage 15a of the two-stage air preheater 15 down to a temperature above the dew point and are then cooled in the second stage 15b to a temperature below the dew point, in order to condense out the sulphuric acid and to withdraw it via the sulphuric acid take-off 45. A tubular air preheater with vertically running tubes and a flue gas inlet at the top of the tubes and with an air flow in multiple crossflow and upward counter-current is particularly suitable for this purpose. In view of the corrosion risk due to the condensed-out sulphuric acid, the second stage 15b of the air preheater 15 consists of an acid-resistant material, for example of glass tubes.

The condensation of the sulphuric acid in the second stage 15b of the air preheater 15 proceeds approximately along the pressure-dependent dew point lines and boiling lines in the diagram of FIG. 6.

As an example, the sulphuric acid condensation under a partial pressure of the mixture components $H_2O/H_2SO_4$ of 0.1 atmosphere and at an initial composition $\xi_A = 90/10\%$ by weight is entered in the diagram of FIG. 6.

The mixed vapour in the state at A cools with $\xi_A =$ constant until the dew point $t_2$ is reached at the point B. At this instant, the first drops of the composition $\xi_C$ condense at the point C (8/92%). The mixed vapour is thus depleted of $H_2SO_4$ so that, on further cooling, its composition changes along the dew point line up to the point D. At the point D, virtually all the sulphuric acid has condensed, that is to say at 140° C. there is virtually only water vapour still present in the flue gases.

The condensate changes its composition along the boiling line for 0.1 atmosphere from the point C to the point E. The vapour condensed last at the point F has the composition $\xi_D$, that is to say it is virtually pure water. The mixture obtained at the point E consists of approximately 81% by weight of $H_2SO_4$ and 19% by weight of $H_2O$. This means that the water vapour content of the flue gases has fallen, since a part of the water vapour was also condensed out of the flue gas.

It would be possible to calculate the fraction of the condensed quantities from the temperature of 140° C. at point F. Of 1 kg of the starting mixture, $\tau$ (kg/kg) have condensed and $\phi$ (kg/kg) remain as vapour, that is to say $$\tau + \phi = 1$$

Since the quantity of $H_2SO_4$ before and during the condensation remains unchanged, the following applies $$\xi_1 = \xi_4 = \delta \times \xi_6 = \phi \times \xi_5$$

or $$\tau = \frac{\xi_4 - \xi_5}{\xi_6 - \xi_5} \text{ and } = \frac{\xi_6 - \xi_4}{\xi_6 - \xi_5}$$

Accordingly, corresponding to point F in the diagram of FIG. 6, $$\tau = \frac{90 - 100}{19 - 100} = 0.1235 \text{ (kg/kg)}$$

have condensed and $$\phi = \frac{19 - 90}{19 - 100} = 0.8765 \text{ (kg/kg)}$$

remain as vapour.

The condensate consists to the extent of 19% by weight of $H_2O$, that is to say $$0.19 \times 0.1235 = 0.0235 \left( \frac{\text{kg } H_2O}{\text{kg}(H_2O + H_2SO_4)} \right)$$

and $$0.81 \times 0.1235 = 0.1000 \left( \frac{\text{kg } H_2SO_4}{\text{kg}(H_2O + H_2SO_4)} \right)$$

have been condensed.

In the desulphurisation according to the invention, the sulphuric acid is virtually completely condensed out.

In addition to the filter ash and boiler hopper ash, approximately 80% sulphuric acid is also obtained in the second stage 15b of the air preheater, as a product for disposal. In the case of a 150 tonnes/hour boiler and 1% of sulphur in the coal, about 400 kg of sulphuric acid per hour, or 3,200 tonnes per year with 8,000 full-load hours per year, are obtained.

The sulphur dioxide oxidation according to the invention not only gives an environmentally acceptable flue gas, but also increases the thermal output of the installation, since this oxidation is exothermic and, with a calorific value of bituminous coal of 6,000 kcal/kg and 1% of sulphur, gives a heat of reaction of 7.18 kcal kg of coal or 0.12% relative to its calorific value.

I claim:

1. Process of reducing the emission of pollutants in flue gases from a furnace arranged to provide a selected thermal output comprising the steps of providing a first combustion stage and a second combustion stage, supplying excess air and fuel into the first combustion stage, flowing the flue gases with residual oxygen therein from the first combustion stage into the second combustion stage and supplying additional fuel into the second combustion stage in the stoichiometric range based on the residual oxygen for effecting combustion therein with the first and second combustion stages providing the combustion heat for the selected thermal output of the furnace, and supplying the preponderant amount of the combustion heat in the first combustion stage in a conventional combustion operation with the excess air adapted to the fuel utilized, and catalytically reducing nitrogen oxides in the flue gases from the second combustion stage into nitrogen.

2. Process of reducing the emission of pollutants in the flue gases from a furnace setup arranged to provide a selected thermal output comprising dividing the furnace setup into a first furnace installation forming a first combustion stage and a second furnace installation forming a second combustion stage separated from the first furnace installation and interconnecting the first and second furnace installations for conveying the flue gases from the first combustion stage to the second combustion stage, supplying fuel and excess air into the first combustion stage and burning the fuel so that flue gases containing residual oxygen are generated, flowing the flue gases and residual oxygen from the first combustion stage into the second combustion stage and supplying additional fuel into the second stage in the stoichiometric range of the residual oxygen and burning the additional fuel and residual oxygen in the second combustion stage, removing the flue gases from the second combustion stage and catalytically reducing nitrogen oxides in the flue gases to nitrogen.

3. A process according to claim 1 or 2, wherein burning the fuel in said first furnace stage with an air excess of 15% and producing about 85% of said required thermal output, and providing the remainder of said required thermal output in said second furnace stage.

4. A process according to claim 1 or 2, including the steps of controlling the supply of said fuel to said first combustion stage as a function of said required thermal output and at substantially constant excess air, and controlling the supply of said additional fuel to said second combustion stage as a function of the oxygen content in said flue gases flowing from the first combustion stage.

5. A process according to claim 4, wherein controlling said fuel supply to said second combustion stage as a function of the oxygen content of said flue gases downstream of said second stage.

6. A process according to claim 1 or 2, including effecting the burning in the second combustion stage by a catalytic afterburning step.

7. A process according to claim 1 or 2, wherein said fuel burned in said first combustion stage is an ash-producing fuel and said process includes the step of precipitating dust from said first stage flue gases, and said additional fuel burned in said second stage in a non-ash-producing fuel.

8. A process according to claim 1 or 2, further comprising the step of catalytically oxidising to sulphur trioxide the sulphur dioxide in said flue gases downstream of said first furnace stage.

9. A process according to claim 8, wherein said second stage includes a feedwater preheater at the cold downstream end of said second furnace stage, and said water inlet temperature of said feedwater preheater is above the dew point of the flue gases.

10. A process according to claim 9, wherein said first stage includes a feedwater preheater at the colder downstream end thereof, and hot water from said first stage feedwater preheater is mixed with said water supplied to said second stage feedwater preheater.

11. A process according to claim 10, wherein a part stream of said hot water is further heated by a preheater located in a steam drum prior to mixture with said water supplied to said second stage feedwater preheater.

12. A process according to claim 8, including a catalytic afterburning step in said second stage, and said sulphur dioxide in said flue gases is oxidised to sulphur trioxide before said afterburning step.

13. A process according to claim 12, including the step of cooling said flue gases to between 400° and 500° C. before said sulphur dioxide oxidation step.

14. A process according to claim 8, wherein said sulphur dioxide in said flue gases is oxidised to sulphur trioxide downstream of said nitrogen oxides reduction step.

15. A process according to claim 14, including the step of cooling said flue gases to between 400° and 500° C. before said sulphur dioxide oxidation step.

16. A process according to claim 15, wherein said flue gases leaving said feedwater preheater of said second furnace stage are cooled by heat exchange with air in a recuperative air preheater.

17. A process according to claim 16, wherein said air preheater is a two-stage heat exchanger having a hot stage above said dew point of said flue gases and a cold stage below said dew point.

18. A process according to claim 17, wherein condensed sulphuric acid is withdrawn from said cold stage of said air preheater.

19. A process according to claim 14, including the step of feeding oxygen into said flue gases upstream of said sulphur dioxide oxidation step.

* * * * *